United States Patent

[11] 3,614,181

[72] Inventor Crawford R. Meeks
 Granada Hills, Calif.
[21] Appl. No. 51,789
[22] Filed July 2, 1970
[45] Patented Oct. 19, 1971
[73] Assignee The United States of America as
 represented by the Secretary of the Air
 Force

[54] MAGNETIC BEARING FOR COMBINED RADIAL AND THRUST LOADS
3 Claims, 6 Drawing Figs.

[52] U.S. Cl. .................................................. 308/10
[51] Int. Cl. .................................................. F16c 39/06
[50] Field of Search .......................................... 308/10;
 74/5.46, 5.7; 73/472, 514

[56] References Cited
UNITED STATES PATENTS

| | | | |
|---|---|---|---|
| 3,493,274 | 3/1970 | Emsilie | 308/10 |
| 2,254,698 | 9/1941 | Hansen | 308/10 |
| 3,243,238 | 3/1966 | Lyman | 308/10 |
| 3,493,275 | 2/1970 | Stone | 308/10 |
| 3,114,582 | 12/1963 | Milligan | 308/10 |

Primary Examiner—D. F. Duggan
Assistant Examiner—R. Skudy
Attorneys—Harry A. Herbert, Jr. and Herbert H. Brown ABSTRACT: A combined radial and thrust magnetic bearing system having a shaft with a plurality of radially polarized magnets secured to the shaft. The radially polarized magnets being positioned within a plurality of corresponding magnets polarized radially opposite to the magnets on the shaft. A pair of axially polarized magnets are also secured to the shaft. The axially polarized magnets being positioned within annular axially polarized magnets which are adjustably positioned with respect to the magnets secured to the shaft so that the axial magnetic bearings may be preloaded.

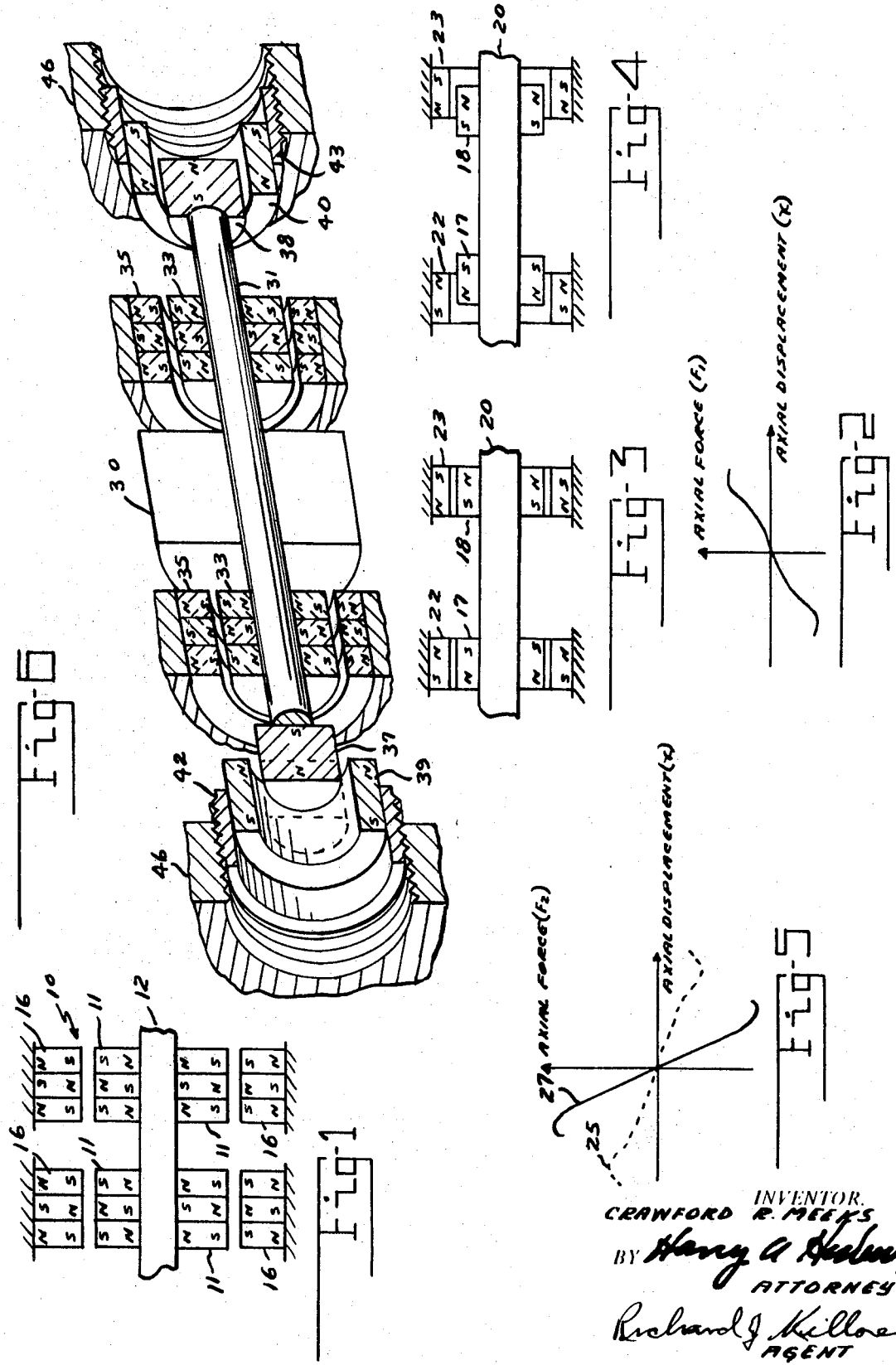

MAGNETIC BEARING FOR COMBINED RADIAL AND THRUST LOADS

BACKGROUND OF THE INVENTION

Prior art designs of magnetic bearings exhibit inherent instability either in the radial or axial direction. To provide stability either electromagnets for axial loading have been used with a position servoloop to maintain the load centered, or mechanical bearings have been used in combination with magnetic bearings. With mechanical bearings there are wear surfaces which require lubrication and have a finite wearout life. The electromagnets require an electrical power input and a complex control mechanism.

SUMMARY OF THE INVENTION

According to this invention, a plurality of radially polarized ring magnets work together with a plurality of radially polarized magnets secured to a shaft to provide a uniform radial repulsion force. These are used with a pair of axially polarized magnets which work together with another pair of axially polarized magnets affixed to the shaft to provide uniform axial repulsion force. The axial magnets are preloaded to increase the axial-restoring force.

IN THE DRAWINGS

FIG. 1 is a schematic illustration of a conventional radial load magnetic bearing;

FIG. 2 shows the general axial displacement vs force characteristic for a radial load magnetic bearing such as shown in FIG. 1;

FIG. 3 shows an unloaded axial thrust bearing system;

FIG. 4 shows a preloaded axial thrust bearing system;

FIG. 5 shows the general axial displacement vs. force characteristics for the bearing systems of FIGS. 3 and 4; and FIG. 6 shows a combined radial load bearing and preload axial thrust bearing system according to the invention.

DETAILED DESCRIPTION OF THE INVENTION

With reference to FIG. 1 of the drawing, reference numeral 10 shows a conventional radial bearing with a plurality of radially polarized ring magnets 11 positioned on a shaft 12. The magnets 11 are positioned within radially polarized ring magnets 16. The general axial force vs. axial displacement characteristics for the device of FIG. 1 is shown in FIG. 2. These bearings are very unstable for axial loads.

A conventional axial thrust bearing is shown in FIG. 3, which has axially polarized magnets 17 and 18 secured to shaft 20. Magnets 17 and 18 are positioned within fixed axially polarized magnets 22 and 23. The general axial force vs. axial displacement characteristic for the device of FIG. 3 is shown at 25 in FIG. 5. The thrust bearing system of FIG. 3 produces a negative force gradient that is an axial restoring force in an opposite direction to displacement from the normal center position. However, for stability the axial-restoring force gradient for the axial thrust bearings must be greater than the axial force gradient of the radial load bearings.

By preloading the axial thrust bearings, as shown in FIG. 4, the restoring force can be increased as shown in the axial force vs. axial displacement characteristic 27 in FIG. 5.

The complete system is shown in FIG. 6 wherein a load shown schematically at 30 is supported on a shaft 31. A plurality of annular radially polarized magnets 33 are secured to the shaft 31. The magnets are positioned within stationary oppositely radially polarized magnets 35 in the conventional manner. Axial polarized magnets 37 and 38 are secured to the shaft 31 by bonding or other well-known means. The magnets 37 and 38 are positioned within axially polarized magnets 39 and 40. The magnets 39 and 40 are secured to threaded or otherwise finely adjustable ring members 42 and 43 by bonding or other well-known means. The ring members 42 and 43 engage threads in support 46. Axial movement of the ring members 42 and 43 with respect to support 46 sets the axial bearing preloading level. The two ring members 42 and 43 are adjusted to properly position the radially polarized magnets 33 within magnets 35.

When the final position of the magnetic bearings is predetermined, and no axial adjustment is desired, adjustable means at one end of the bearing system is sufficient. Also, the preloading adjustment could be provided, by having means to adjust the positions of magnets 37 and 38 on shaft 31.

The particular arrangement of the load and bearings is merely illustrative and it is to be understood that the position of the radial bearings and load with respect to the thrust bearings may be other than as shown.

There is, thus, provided a stable bearing system for combined radial and thrust loads which provide longer life than prior art bearing systems and which requires no mechanical bearings or electrical power input.

I claim:

1. A magnetic suspension system, comprising: a rotatable shaft; means for providing radial magnetic support for said shaft including a plurality of radially polarized magnets secured to said shaft and a plurality of oppositely polarized magnets surrounding each of the magnets secured to said shaft; a first axially polarized magnet secured to said shaft; a second axially polarized magnet secured to said shaft with its polarity opposite to said first axially polarized magnet; a first axially polarized ring magnet positioned concentrically adjacent said first axially polarized magnet; said first ring magnet having a polarization to said first axially polarized magnet; a second axially polarized ring magnet positioned concentrically adjacent said second axially polarized magnet; said second ring magnet having a polarization opposite to said second axially polarized magnet; means, including apparatus to adjust the axial position of said ring magnets with respect to said axially polarized magnets attached to the shaft, for axially adjusting the preload of the axially polarized magnets.

2. The device as recited in claim 1 wherein said means for axially adjusting the preload of the axially polarized magnets includes a support member and a ring member, attached to one of said axially polarized ring magnets, threadably engaging said support member.

3. The device as recited in claim 2 wherein said means for axially adjusting the preload of the axially polarized magnets includes a second support member and a second ring member, attached to the other of said axially polarized ring magnets, threadably engaging said second support member.